Aug. 25, 1936.    H. A. SHARON    2,052,038

QUICK ACTING HOSE CONNECTER

Filed Jan. 16, 1934

Inventor:

H. A. Sharon

Patented Aug. 25, 1936

2,052,038

UNITED STATES PATENT OFFICE 2,052,038

QUICK ACTING HOSE CONNECTER

Hugh Alexander Sharon, South Pasadena, Calif.

Application January 16, 1934, Serial No. 706,799½

4 Claims. (Cl. 285—150)

The invention relates to improvements in quick acting hose connecters or couplings that have gaskets or machined joints.

Fig. 1 in the drawing is a perspective view of the connecter with the jaws 2 and 3 closed.

Figure 1:
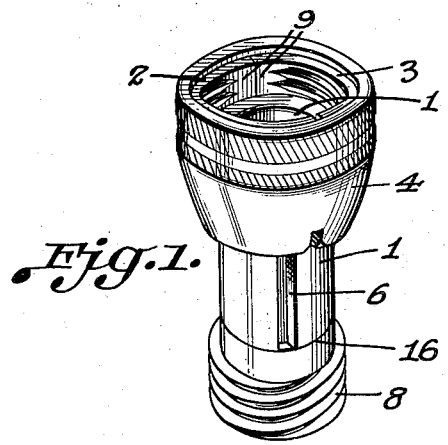
Figure 4:
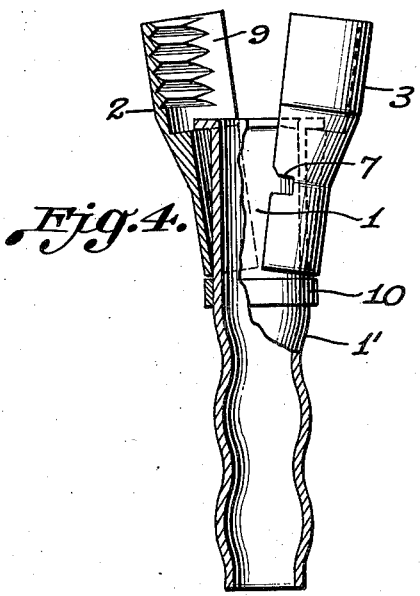

Fig. 4 shows a cross section of the internally threaded jaws 2 and 3 open with flanged tube 1' corrugated, to be used directly in the hose without any other connection.

Figure 5:
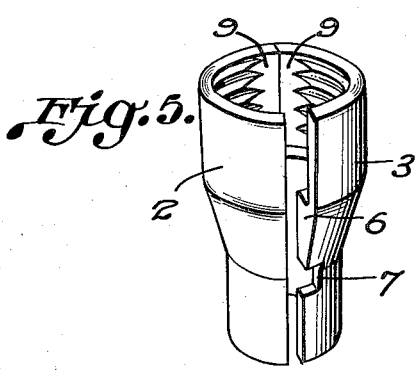
Figure 3:
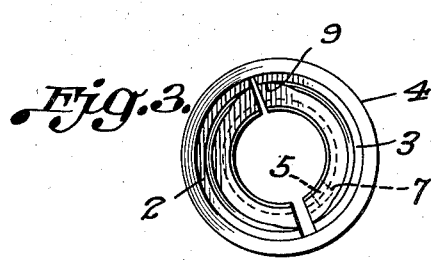
Fig. 3 is an end view of the connecter.

Fig. 5 shows a perspective view of the jaws 2 and 3 showing groove 6 and locking pocket 7.

Figure 6:
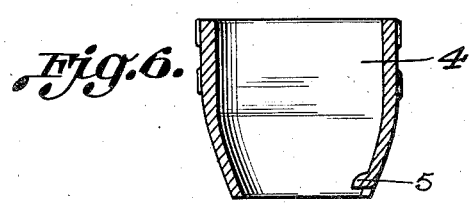

Fig. 6 shows a conical sliding sleeve 4 with the integral lug or projection 5.

Figure 7:
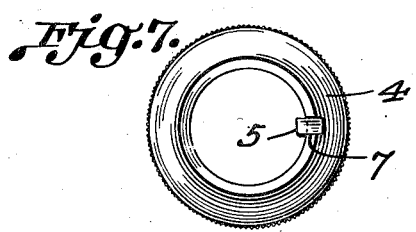

Fig. 7 is an end view of the sleeve shown in Fig. 6.

The internally threaded semi-cylindrical jaws 2 and 3 fit loosely around the flanged tube 1 when open and are held in position by the conical sliding sleeve 4 against the flange of the tube at 15 and the shoulder of collar 8 at 16. The loose fitting jaws 2 and 3 allow the threads of 2 and 3 to mesh or fit readily into the threads of a hose bibb, hydrant or other like connection when the jaws are being closed.

Figure 2:
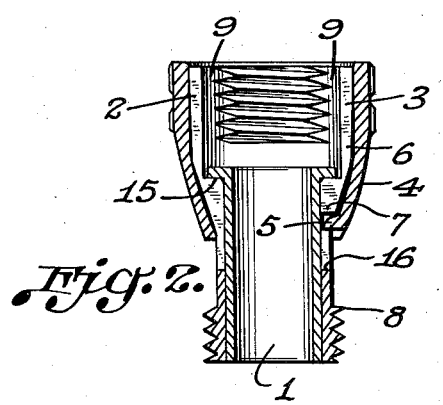
Fig. 2 shows a cross section of the details of the connecter as used in conjunction with a standard hose coupling or connecter.

In operation, the sliding sleeve 4, Fig. 2, closes the jaws 2 and 3 when pushed toward the threaded ends of the jaws, around the threads of a hose bibb, hydrant or other like connection then a slight turn to the right (if a right hand thread is used) causes the integral lug 5 which slides in groove 6 to turn the jaws 2 and 3 free and independent of the flanged tube 1 thus making a tight even connection between the hose bibb, hydrant or other like connection and flanged tube 1 with no turning movement between the tube 1 and the hydrant to injure the seat or gasket. This same slight turning movement of the conical sliding sleeve 4 puts the integral lug 5 into the pocket 7 and holds or locks the connecter in the closed position.

To disconnect, a slight turn to the left of the conical sliding sleeve and the sliding of it away from the threaded ends of the jaws allows the connecter to be slipped off easily and quickly.

At 10, Fig. 4, a retaining ring is fastened solidly to tube 1', this ring retains the jaws 2 and 3 as does the shoulder of collar 8 at 16 Fig. 2, the sliding sleeve 4 is also held on by the integral lug 5 resting against ring 10 when the jaws are in the open position. A portion of the threads of the jaws 2 and 3 is cut away as shown at 9 to reduce the amount of opening required to open the jaws 2 and 3 enough to allow them to be slipped over the threads of a hose bibb, hydrant or other like connection.

I claim:

1. In a quick acting hose connecting device as described in the foregoing specifications a central radial flanged conducting tube with a threaded member or sleeve suitable to be connected to a standard hose coupling, two internally threaded jaws semi cylindrical in form having a shoulder formed at the base of the threaded portion, the smaller body portion of said jaws fitting around the central conducting tube between the aforesaid flange and the aforesaid threaded sleeve and retained loosely in this position by a slidable conical shaped sleeve.

2. A device having a central conducting tube flanged at one end and a threaded sleeve at the other end, two internally threaded jaws that fit loosely around the central conducting tube, the shoulders of said jaws having a bearing against said flange, a conical sliding sleeve retaining said jaws loosely around said central conducting tube and operable to close the said jaws and which upon retraction allows the jaws to open freely when pushed on or taken off the threads of a hose bibb, hydrant or other like threaded connection, and a lug formed on the inside of the conical sliding sleeve as an integral part thereof for the purpose of rotating said jaws the amount required to tighten the threads of the jaws to the threads of a hose bibb, hydrant or other like connection.

3. A quick acting hose connecting device having a central flanged conducting tube suitable internally threaded jaws that fit loosely around said tube, a conical sliding sleeve provided for closing and allowing said jaws to open when pushed on or taken off a hose bibb, hydrant or other like connection, said conical shaped sleeve having an integral lug, a suitable groove for receiving said lug, a pocket at the end of said groove for said lug to fit into to hold the jaws in the closed position around the threads of the member they are to be connected to, and for rotating said jaws the amount required to join said conducting tube tightly to a hose bibb, hydrant or other like threaded connection.

4. A quick acting hose connecting device having a central conducting tube with a flange at one end, corrugations at the other end suitable for being fastened into the end of a hose, a collar or sleeve fastened around said central conducting tube, two internally threaded jaws fitting loosely around the central conducting tube between said flange and said collar or sleeve, a conical sliding sleeve with an integral lug, a suitable groove for said lug to slide in, a pocket at the end of said groove for said lug to fit into to hold the internally threaded jaws in the closed position around the threads of a hose bibb, hydrant or other like threaded connection.

HUGH ALEXANDER SHARON.